(12) United States Patent
Buckley et al.

(10) Patent No.: US 7,187,736 B2
(45) Date of Patent: *Mar. 6, 2007

(54) REDUCING INTERFERENCE IN A GSM COMMUNICATION SYSTEM

(75) Inventors: Michael Eoin Buckley, Grayslake, IL (US); Raja S. Bachu, Waukegan, IL (US); Kenneth A. Stewart, Grayslake, IL (US); Clint S. Wilkins, Chicago, IL (US)

(73) Assignee: Motorola Inc., Schaumburg, IL (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/366,106

(22) Filed: Feb. 13, 2003

(65) Prior Publication Data

US 2004/0161065 A1    Aug. 19, 2004

(51) Int. Cl.
 *H04B 1/10* (2006.01)
(52) U.S. Cl. ...................... 375/350; 375/231
(58) Field of Classification Search ........... 375/229, 375/231–232, 235, 284, 346, 348, 350; 455/504, 455/506, 63.1, 65, 278.1
See application file for complete search history.

(56) References Cited

U.S. PATENT DOCUMENTS

| 3,978,407 | A | * | 8/1976 | Forney et al. ............ 375/231 |
| 4,152,649 | A | * | 5/1979 | Choquet .................. 375/231 |
| 4,290,139 | A | * | 9/1981 | Walsh ..................... 375/232 |
| 4,881,240 | A | * | 11/1989 | Critchlow et al. .......... 375/235 |
| 5,168,507 | A | * | 12/1992 | Critchlow et al. .......... 375/231 |
| 5,335,250 | A | * | 8/1994 | Dent et al. ............... 375/224 |
| 5,678,222 | A | * | 10/1997 | Hornak et al. ........... 379/93.26 |
| 5,724,390 | A | * | 3/1998 | Blaker et al. .............. 375/229 |
| 5,933,768 | A | | 8/1999 | Skold et al. |
| 5,974,306 | A | * | 10/1999 | Hornak et al. ............. 455/323 |
| 6,002,716 | A | * | 12/1999 | Meyer et al. .............. 375/231 |
| 6,026,130 | A | | 2/2000 | Rahmatullah et al. |
| 6,044,111 | A | | 3/2000 | Meyer et al. |
| 6,084,862 | A | * | 7/2000 | Bjork et al. .............. 370/292 |
| 6,330,294 | B1 | * | 12/2001 | Ansbro et al. ............. 375/347 |
| 6,353,639 | B1 | * | 3/2002 | Prange et al. ............. 375/261 |
| 6,463,107 | B1 | * | 10/2002 | Lindoff et al. ............ 375/343 |
| 6,859,491 | B1 | * | 2/2005 | Zhou ....................... 375/231 |
| 6,907,092 | B1 | * | 6/2005 | Yakhnich et al. .......... 375/346 |
| 2002/0131488 | A1 | | 9/2002 | Allpress et al. |
| 2002/0131489 | A1 | | 9/2002 | Allpress et al. |
| 2002/0141437 | A1 | | 10/2002 | Meyer et al. |

FOREIGN PATENT DOCUMENTS

WO         WO98/16021        4/1998

(Continued)

OTHER PUBLICATIONS

Trigui, Hafedh; Slock, Dirk T.M.; "Training Sequence Based Multiuser Channel Identification For Cochannel Interference Cancellation In GSM", IEEE 1999.

(Continued)

*Primary Examiner*—Khanh Tran
(74) *Attorney, Agent, or Firm*—Brian M. Mancini; Randall S. Vaas

(57) ABSTRACT

A method for reducing interference in a desired signal in a GSM communication system uses a finite-impulse-response filter for alternate linear equalization. The method includes a first step (300) of inputting a burst of data of a received waveform including interference from a channel of the communication system. A next step (302) includes training the finite-impulse-response filter with a set of symbols of specific quadrature phase, known a priori, in the burst of data of the received waveform. For example known real only and imaginary only symbols are alternatively selected from a midamble of the data burst. A next step (304) includes operating on the received waveform with the finite-impulse-response filter to alternately linearly equalize the burst of data to provide an estimate of the desired signal.

15 Claims, 2 Drawing Sheets

FOREIGN PATENT DOCUMENTS

WO        WO00/64061        10/2000

OTHER PUBLICATIONS

"Single Antenna Interference Cancellation in MS for GSM Networks" Cingular Wireless, Philips Semiconductors, SBC Technology Resources, Inc. 3GPP TSG-GERAN # 9, Seattle, WA, Apr. 15-19, 2002.

"Downlink GMSK Interference Suppression" Ericsson, 3GPP TSG Geran #9, Seattle, WA, Apr. 15-19, 2002.

Castoldi, Piero; Raheli, Ricardo; Marino, Giovanni. "Efficient Trellis Search Algorithms For Adaptive MLSE On Fast Rayleigh Fading Channels", IEEE 1994.

Hafeez, Abdulrauf; Molnar, Karl J.; Bottomley, Gregory E. "Co-Channel Interference Cancellation For D-Amps Handsets" IEEE 1999.

"Laboratory & Field Testing of SAIC for GSM Networks" Cingular Wireless, Philips Semiconductors. 3GPP TSG GERAN # 11, Los Angeles, CA, USA. Aug. 26-30, 2002.

* cited by examiner

REDUCING INTERFERENCE IN A GSM COMMUNICATION SYSTEM

FIELD OF THE INVENTION

This invention relates generally to communication systems, and more particularly to reducing interference of a receiver signal in a communication system.

BACKGROUND OF THE INVENTION

Wireless communication systems have an ever-increasing use in transferring voice and data services. Such communication systems include the Global System for Mobile (GSM) communication. However, stray signals, or signals intentionally introduced by frequency reuse methods, can interfere with the proper transmission and reception of voice and data signals and can lower capacity. As a result, a receiver must be capable of processing a signal with interference from at least one channel and extract the desired information sent to the user of interest. It is well known that, for typical cell layouts, the major source of noise experienced by GSM communication devices is due to co-channel or adjacent channel interference. Such noise sources arise from nearby devices transmitting on or near the same channel as the desired signal, or from adjacent channel interference, such as that arising on the desired channel due to spectral leakage for example. Additionally, even in the case no other signal interference is present, the received signal may consist of multiple copies of the transmitted data sequence for example due to multipath channel conditions. This effect is sometimes referred to as self-interference.

Traditionally, the effects of multipath channels are compensated either through the use of Maximum Likelihood Sequence Estimation (MLSE) which is usually implemented using the Viterbi algorithm, or through filtering techniques. In the filtering approach, a desired signal symbol sequence can be estimated by adjusting the filter parameters. Classically, the filter parameters can be determined using the modulated symbol and training sequences contained within the desired signal using well known techniques, such as the Minimum Mean Square Error Block Linear Equalizer (MMSE-BLE) for example, which operates on the complex values of the signal and generally can be implemented in the frequency and time domains.

Traditionally, interference cancellation techniques have focused on adjacent channel suppression by using several filtering operations to suppress the frequencies of the received signal that are not also occupied by the desired signal. Correspondingly, co-channel interference techniques have been proposed, such as joint demodulation, which generally require joint channel estimation methods such as per-survivor-processing, as is known in the art. Joint channel estimation provides a joint determination of impulse responses of co-channel signals and may be based on methods such as per-survivor-processing, as is known in the art. Given a known training sequence, all the co-channel interferers can be estimated jointly. However, this requires a large amount of processing power which constrains the number of equalization parameters than can be used efficiently. Moreover, classical joint demodulation only addresses one co-channel interferer, and does not address adjacent channel interference.

Multiple antenna techniques have also been proposed but these can be complex in their terms of hardware implementation and are therefore are mainly more suited to a base station application. Unfortunately, all of the above techniques are non-trivial in either implementation and/or complexity.

There is a need therefore for improved signal detection in an interference-limited environment. In particular, it would be advantageous to provide linear equalization of the signal to reduce interference from both co-channel and adjacent channel noise sources. It would also be of benefit to provide a low-complexity interference solution using existing hardware while reducing the required processor resources.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

Figure 1:
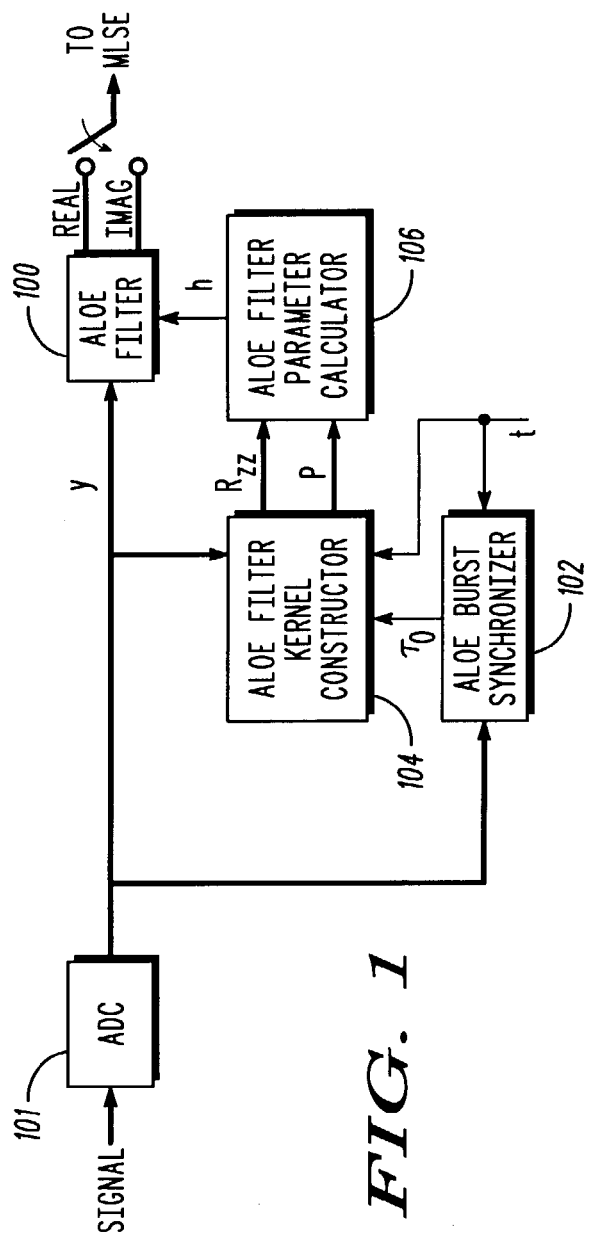
FIG. 1 shows a simplified block diagram of a receiver with an alternate linear output equalizer filter, in accordance with the present invention.

The present invention reduces co-channel and adjacent channel interference in a communication system using a linear finite-impulse-response (FIR) filter with reduced computational complexity, but without sacrificing interference cancellation performance. The invention uses a filter specially adapted to the Gaussian Minimum Shift Keying (GMSK) modulation used for GSM signals but is applicable to any modulation with a generally constrained modulation constellation, and can be implemented with low complexity. Moreover, the invention uses non-linear processing to achieve the linear equalization. Further, no additional hardware is required and processor requirements are reduced by about three-fourths. Specifically, a filter estimator is trained using symbols with a known specific phase in a received signal. More specifically, training symbols are used having a known 90-degree phase difference, and in particular symbols having only real or imaginary values. Advantageously, by limiting the symbols to a constrained phase relationship, the complexity of calculations to be performed in order to linearly equalize the received signal are reduced, and result in very good performance.

In detail, this is achieved as follows. In the description below, any quantities $(.)^T$, $(.)^H$, $(.)^{-1}$ represent the transposition, conjugate transposition, and inversion of matrices, respectively, and bold letters indicate vectors or matrices.

One can define α (k) as a desired user's transmitted data sequence of symbols where $$a(k) \in \begin{cases} \{\pm 1\}, k \in \{1, 3, 5, \ldots\} \\ \{\pm j\}, k \in \{2, 4, 6, \ldots\} \end{cases}$$

In other words, each transmitted symbol a(k) in the GSM system (when GMSK modulation is used) consists of either an in-phase (I) or a quadrature (Q) component. A known string of training symbols is defined for a burst of data with GMSK modulation in the GSM system. This string corresponds to a set of twenty six symbols referred to as the midamble, $a(k):k \in \{62, 63, \ldots, 87\}$, that are known a priori. The training sequence can be used to determine filter parameters to reduce interference, as will be described below.

Due to co-channel, self and/or adjacent channel interference, the desired sequence, a(k), can contain errors. The actually observed received signal can be represented by y(k). Then the midamble of the received signal, y(62, 63, ..., 87), contains the actual received training sequence of the first hypothesized arriving ray of the received signal. An error is defined as the difference between the desired and received estimated sequence, a(k) and â(k), i.e. between what was originally sent and what is actually estimated by the receiver. A filter can be applied to the actually received signal, y(k), to minimize this error. For example, a prior art complex linear estimate of a(k) is defined as $$\hat{a}_c(k) = h_c^H \times y(k)$$

where $h_c^H = [h_c(0), h_c(1), \ldots, h_c(N_k-1)]^T$ is the complex linear tap estimator of the filter, $y(k) = [y(k), y(k+1), \ldots, y(k+N_h-1)]$, and $N_k$ is the number of taps of the filter. This complex linear tap estimate could then used with the observed signal to determine the error as follows $$Err_c = \sum_{k=62}^{87} |\hat{a}_c(k) - a(k)|^2$$

The obvious but inefficient approach for optimizing $h_c^H$ is to minimize the complex sum-squared error, $Err_c$, using the known midamble training sequence bits.

However, the present invention takes advantage of the fact that it is known a priori that a(k) is either purely real or imaginary, due to the GMSK modulation. Therefore, improved performance can be obtained by minimizing the sum-squared error but by using the modified error metric $$Err = \sum_{k=62}^{87} |\hat{a}(k) - a(k)|^2$$

where the linear estimate â(k) is defined as:

$$\hat{a}(k) = \begin{cases} \text{real}(h^H \times y(k)), k \in \{1, 3, 5, \ldots\} \\ \text{imag}(h^H \times y(k)), k \in \{2, 4, 6, \ldots\} \end{cases}$$

where â(k) is now always purely real or purely imaginary.

Therefore, a novel aspect of the present invention, distinct from the traditional approach to equalization, is that the real/imaginary portion of the $k^{th}$ equalizer output is taken as an estimate of the non-zero (real/imaginary) portion of the data symbol a(k). This finds particular advantage, in that interference products, which are typically subject to fading, are therefore subject to phase rotation distinguishable from the real-only values of â(k). The use of the fixed-phase, real/imaginary portions of the midamble provide a distinction that can then be used to eliminate the interference products. Moreover, the use of only real/imaginary data in minimizing the sum-squared error simplifies calculations.

The linear estimator h can be optimized based on a least-squares estimate calculated using the following equation $$\overline{h} = (Z^T Z)^{-1} Z^T t$$

where $\overline{h}$ is a purely real vector of length $2N_k$ (for the particular case of symbol-spaced operation, and where the approach is readily extended to fractional filter tap-spacing) containing the $N_k$ real values and the $N_k$ imaginary values of the linear filter, t is a vector containing the non-zero real and imaginary components of the training sequence, and Z is the observation matrix of the received signal values. In the example below, a five tap filter is used ($N_k$=5). Therefore, each row of the Z observation matrix comprises five imaginary and five real values of y.

Letting $y_R(k)$, $h_R(k)$ and $a_R(k)$ denote the real part and $y_I(k)$, $h_I(k)$ and $a_I(k)$ denote the imaginary part of y(k), h(k) and a(k) respectively, then the optimal linear estimator h is solved by matrix inversion through the convolution of t with Z in accordance with the above equation. In particular, the unknown impulse response h can be calculated through a well known relationship as the matrix product of $$\overline{h} = R_{ZZ}^{-1} p$$

where $R_{ZZ} = Z^T Z$ is the autocorrelation matrix, and $p = Z^T t$ p is the cross-correlation vector, and where $$\overline{h} = \begin{bmatrix} h_R(0) \\ \vdots \\ h_R(N_k - 1) \\ h_I(0) \\ \vdots \\ h_I(N_k - 1) \end{bmatrix} \text{ and } t = \begin{bmatrix} a_I(62) \\ a_R(63) \\ a_I(64) \\ a_R(65) \\ \vdots \\ a_I(86) \\ a_R(87) \end{bmatrix} \text{ and }$$

$$Z = \begin{bmatrix} y_I(62+N_h-1) & \ldots & y_I(62) & y_R(62+N_h-1) & \ldots & y_R(62) \\ y_R(63+N_h-1) & \ldots & y_R(63) & -y_I(63+N_h-1) & \ldots & -y_I(63) \\ y_I(64+N_h-1) & \ldots & y_I(64) & y_R(64+N_h-1) & \ldots & y_R(64) \\ y_R(65+N_h-1) & \ldots & y_R(65) & -y_I(65+N_h-1) & \ldots & -y_I(65) \\ \vdots & \ddots & \vdots & \vdots & \ddots & \vdots \\ y_I(86+N_h-1) & \ldots & y_I(86) & y_R(86+N_h-1) & \ldots & y_R(86) \\ y_R(87+N_h-1) & \ldots & y_R(87) & -y_I(87+N_h-1) & \ldots & -y_I(87) \end{bmatrix}$$

Having determined h, an optimized signal estimate â(k) can then be retrieved by $$\hat{a}(k) = \begin{cases} \text{real}(h^H \times y(k)), k \in \{1, 3, 5, \dots\} \\ j \times \text{imag}(h^H \times y(k)), k \in \{2, 4, 6, \dots\} \end{cases}$$

In this way, the filter is applied to the entire received data burst achieving co-channel and adjacent channel interference suppression through diversity in phase. After interference rejection, the equalized data is may then optionally be further processed in a known manner using Maximum Likelihood Sequence Estimation (MLSE) techniques, or other known equalization methods.

Advantageously, the present invention does not require complex-conjugate manipulation of time or frequency shifting of signals to produce a corrected estimate of the desired signal. Moreover, linear combining of original, frequency-shifted, or complex-conjugate signals is not performed. Rather, the present invention exploits the phase redundancy of the GMSK waveform by alternatively extracting, according to reference timing established for processing the received burst, the real or imaginary part of the generally complex-valued taps of the equalizing filter. Therefore, non-linear means are used, founded through linear equalization methods. Further, the present invention is not based on considerations of cyclostationarity, but is instead constructed by exploiting the signaling phase occupancy redundancy inherent in GMSK waveforms.

Optionally, the present invention can multiplex the real and imaginary components of the received signal upon entry to the filter. In summary, only the real or imaginary portion of the filtering operation is retained. It is therefore computationally wasteful to compute the portion that is not retained. This is achieved through the multiplexing procedure described below. In brief, computations are performed for either $(h_r^T y_r(k) + h_i^T y_i(k))$ when the output is purely real or $(h_r^T y_i(k) - h_i^T y_r(k))$ when the output is purely imaginary. This multiplexing can be used as a means for further reducing computational complexity and to increase efficiency of the filter. This derives in a straightforward fashion in the present invention by noting that the output of the filter is alternately selected as the real and imaginary components. Noting that, if at a time k the filter output x(k) is expressed as:

$$\begin{aligned} x(k) &= h^H y(k) \\ &= (h_r + jh_i)^H (y_r(k) + jy_i(k)) \\ &= (h_r - jh_i)^T (y_r(k) + jy_i(k)) \\ &= (h_r^T y_r(k) + h_i^T y_i(k)) + j(h_r^T y_i(k) - h_i^T y_r(k)) \end{aligned}$$

From the above, it can be seen that alternatively selecting the real and imaginary parts of the filter output can be viewed as equivalent to loading, in alternating fashion, the real and imaginary parts of the received signal y(k) into the real-valued filter apparatus used to form the respective inner products with the real and imaginary parts of the filter taps. In other words, if the data vectors loaded into the filters $h_r$ and $h_i$ at time k are $y_r$ and $y_i$ respectively, then the vectors loaded into $h_r$ and $h_i$ at time k+1 are $y_i$ and $-y_r$.

Figure 2:
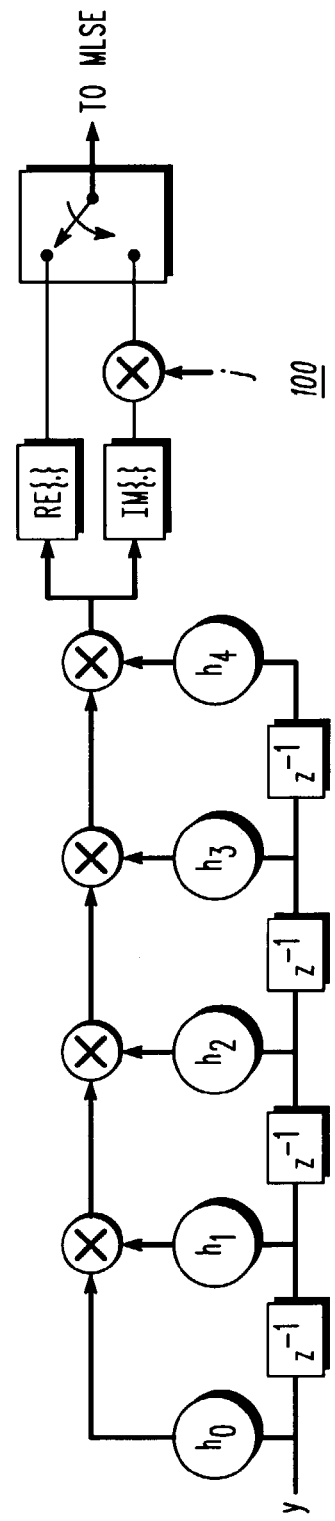
FIG. 2 shows a simplified block diagram of the filter of FIG. 1.

Turning to FIGS. 1 and 2, a receiver is shown with an alternate linear output equalizer (ALOE) for reducing interference in a desired signal in a GSM communication system, in accordance with the present invention. In these figures, thick lines represent the flow of complex values and thin lines represent real values. The front end of the receiver has a conventional configuration as is well known in the art and therefore elements such as frequency converters etc. are not shown for simplicity, other than an analog-to-digital converter 101 (ADC) operable to convert an input signal that includes a desired signal and a co-channel interferer or adjacent channel interferer signal to an input digital waveform, y. Typically, one or more ADCs can be provided, such as for the digital conversion of in-phase (I) and quadrature (Q) data, as is known in the art.

A burst synchronizer 102 is operable to input the digital waveform and determine a synchronization delay, $\tau_0$, between the signals from the desired user and the co-channel interferer. Generally, this includes an approximate or coarse synchronization from a tracking function and a fine delay determination, both using techniques known in the art. A matrix kernel constructor 104 is coupled to the burst synchronizer. The kernel constructor assembles the observation matrix Z from the midamble portion of the input digital waveform and corrects for timing using the synchronization delay, $\tau_0$. The kernel constructor then computes auto correlation matrix $R_{ZZ}=Z^T Z$ and cross-correlation vector $p=Z^T t$. The present invention also envisions the use of one or more of leading zeros and ending zeros of a burst of waveform data for filter training since zeros also present a fixed phase relationship. These can be used in addition to, or instead of, the midamble.

The autocorrelation matrix $R_{ZZ}$, and the desired cross-correlation vector p is then passed to a filter parameter calculator 106 coupled to the kernel constructor. The filter parameter estimator is operable to input the autocorrelation matrix and the desired cross-correlation vector to define linear tap estimates, h, for the alternate linear output equalizer filter 100, which is a finite-impulse-response (FIR) filter coupled to the filter parameter calculator. As detailed in FIG. 2, the FIR filter is operable to input the tap parameters, $h_i$, (shown here as five taps separated by one-symbol delays, $z^{-1}$) to operate on the waveform and also to output alternating real values of the real and imaginary components of the waveform to alternately linearly equalize the waveform to provide an estimate of the desired signal. This equalized signal is may then optionally be processed normally in a Maximum Likelihood Sequence Estimator (MLSE) for example, using techniques known in the art to output the estimated data sequence.

In practice, the burst of waveform data is GMSK modulated, which is used to advantage for the training sequence in that the midamble consists of alternating real and imaginary symbols, which are extracted by alternate switching, for training the finite-impulse-response filter. The present invention can also use of one or more of the three leading zeros and three tail zeros of a burst of waveform data as a portion of the filter training sequence since those zeros also present a fixed phase relationship. These can be used in addition to, or instead of, the midamble. The filter parameter calculator 106 minimizes the sum-squared error between a linear real estimate of the real and imaginary components of the training sequence of the filter and the received waveform, as explained previously.

Figure 3:
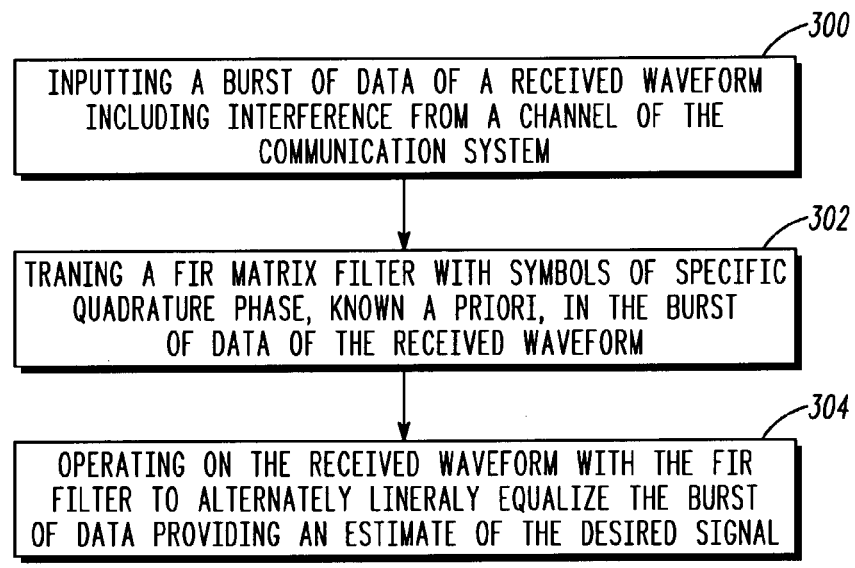
FIG. 3 shows a flowchart for a method for alternate linear output equalization, in accordance with the present invention.

Referring to FIG. 3, a method for reducing interference in a desired signal in a GSM communication system uses a finite-impulse-response filter for alternate linear equalization, in accordance with the present invention. The method includes a first step 300 of inputting a burst of data of a received waveform including interference from a channel of the communication system.

A next step 302 includes training the finite-impulse-response filter with a set of symbols of specific quadrature phase, known a priori, in the burst of data of the received waveform. For example known real and imaginary components are alternatively selected from a midamble of a GMSK data burst. The set of symbols used for training can include one or more of leading zeros and ending zeros of the burst of data. This can be in addition to the midamble or instead of the midamble. Preferably, the set of symbols used for training are the midamble of the burst of data. This is most applicable where the burst of data is GMSK modulated since the midamble symbols only consists of a real or an imaginary-valued component, wherein the training step extracts the alternating non-zero real and imaginary components of the midamble symbols for training the finite-impulse-response filter. These components are then used in minimizing the sum-squared error between a linear real estimate of the real and imaginary components of the training sequence of the filter and the received waveform.

A next step 304 includes operating on the received waveform with the finite-impulse-response filter to alternately linearly equalize the burst of data to provide an estimate of the desired signal. Optionally, the operating step includes a substep of multiplexing the real and imaginary components of the received signal upon entry to the filter.

EXAMPLE

A numerical simulation was performed using equalization, in accordance with the present invention. The results are provided below. Simulation data represents a single GMSK interferer synchronized with a user of interest in a typical urban environment (TU3 IFH), 3 kilometers per hour, ideal frequency hopping, AMR at 12.2 kbps, as specified in known ETSI standards. A frame error rate was calculated for several carrier-to-interference ratios.

Figure 4:
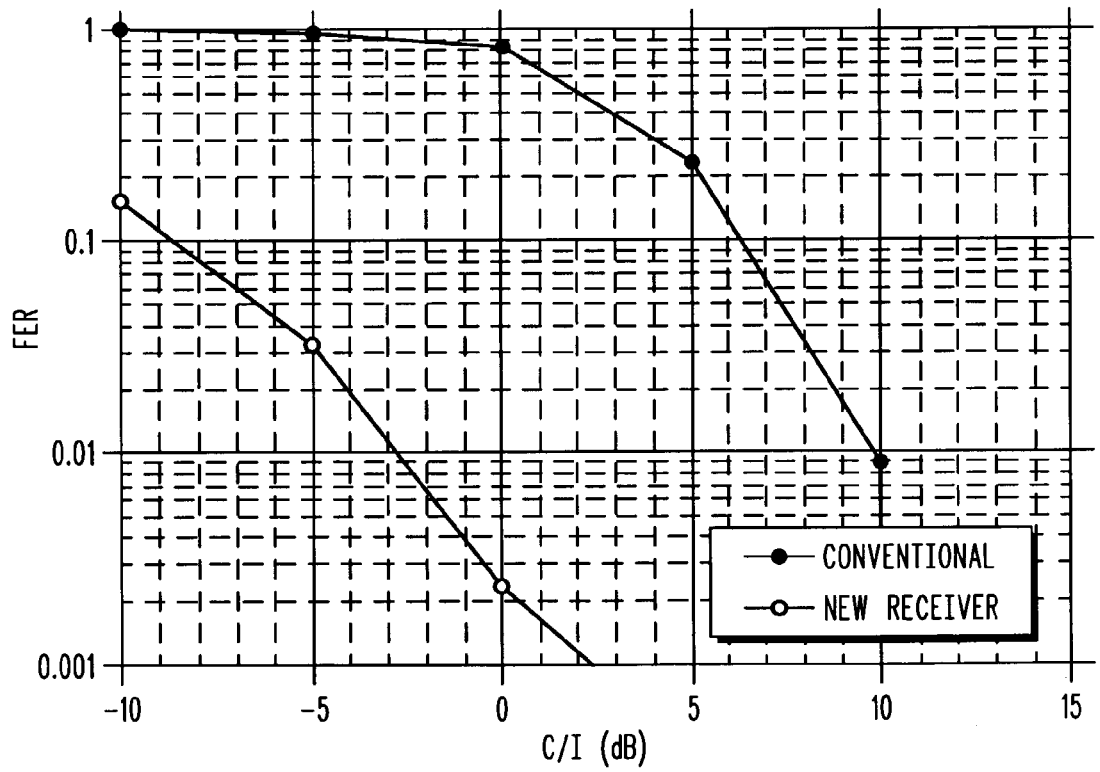
FIG. 4 shows a graphical representation the performance improvement provided by the present invention.

FIG. 4 shows a graph of the results indicating frame-error-rate (FER) versus C/I (carrier/interference ratio) in an operating environment as specified above. A conventional receiver (conventional MLSE Viterbi equalizer) is compared to a receiver incorporating the present invention. As can be seen, the present invention provides much improved frame error rate (shown as the lower curve) the prior art conventional receiver (shown as the upper curve). In addition, this is accomplished with much fewer calculations as described previously.

In review, the present invention reduces co-channel, self and adjacent channel interference in a TDMA or GSM communication system, and in particular for GMSK modulation, using a finite-impulse-response filter alternate linear output equalization that reduces computational complexity without sacrificing performance. No additional hardware is required and processor resource requirements are reduced.

While specific components and functions of the present invention are described above, fewer or additional functions could be employed by one skilled in the art and be within the broad scope of the present invention. The invention should be limited only by the appended claims.

What is claimed is:

1. A method for reducing interference in a desired signal in a GSM communication system using a finite-impulse-response filter, the method comprising the steps of:

inputting a burst of data of a received waveform including interference from a channel of the communication system;

training the finite-impulse-response filter with a set of symbols of specific quadrature phase, known a priori, in the burst of data of the received waveform; and operating on the received waveform with the finite-impulse-response filter to alternately linearly equalize the burst of data to provide an estimate of the desired signal.

2. The method of claim 1, wherein in the training step the set of symbols used for training are one or more of leading zeros and ending zeros of the burst of data.

3. The method of claim 1, wherein in the training step the set of symbols used for training are the midamble of the burst of data.

4. The method of claim 3, wherein the burst of data is GMSK modulated, and wherein the training step extracts alternating non-zero real and imaginary components of the midamble symbols for training the finite-impulse-response filter.

5. The method of claim 4, wherein the training step includes minimizing the sum-squared error between a linear real estimate of the real and imaginary components of the training sequence of the filter and the received waveform.

6. The method of claim 1, wherein the operating step includes a substep of multiplexing the real and imaginary components of the received signal upon entry to the filter.

7. A method for reducing interference in a desired signal in a GSM communication system using a finite-impulse-response filter, the method comprising the steps of:

inputting a burst of data of a received GMSK waveform including interference from a channel of the communication system;

training the finite-impulse-response filter with a set of the alternating non-zero real and imaginary components of the midamble symbols, known a priori, in the burst of data of the received waveform; and operating on the received waveform with the finite-impulse-response filter to alternately linearly equalize the burst of data to provide an estimate of the desired signal.

8. The method of claim 7, wherein the training step includes minimizing the sum-squared error between a linear real estimate of the real and imaginary non-zero components of the training sequence of the filter and the received waveform.

9. The method of claim 7, wherein the operating step includes a substep of multiplexing the non-zero real and imaginary components of the received signal upon entry to the filter.

10. A receiver with an alternate linear output equalizer for reducing interference in a desired signal in a GSM communication system, the receiver comprising:

an analog-to-digital converter operable to convert an input signal that includes a desired signal and a co-channel interferer signal to an input waveform;

a burst synchronizer operable to input the digital waveform and determine a synchronization delay between the signals from the desired user and the co-channel interferer;

a matrix kernel constructor coupled to the burst synchronizer, the kernel constructor operable to input the digital waveform, the delay, and a real set of a training sequence derived from the digital waveform to constructor an observation matrix;

a filter parameter calculator coupled to the kernel constructor; the filter parameter estimator operable to input the observation matrix to define linear tap estimates; and a finite-impulse-response (FIR) filter coupled to the filter parameter calculator, the filter operable to input the tap parameters to operate on the waveform and output alternating real only and imaginary only symbols to provide an estimate of the desired signal.

11. The receiver of claim 10, wherein a set of symbols used for the training sequence is one or more of leading zeros and ending zeros of a burst of waveform data.

12. The receiver of claim 10, wherein a set of symbols used for the training sequence is a midamble of a burst of waveform data.

13. The receiver of claim 12, wherein the burst of waveform data is GMSK modulated, and wherein the training sequence is alternating real only and imaginary only symbols of the midamble extracted for training the finite-impulse-response filter.

14. The receiver of claim 13, wherein the filter parameter calculator minimizes the sum-squared error between a linear real estimate of the real only and imaginary only symbols of the training sequence of the filter and the received waveform.

15. The receiver of claim 10, wherein the finite-impulse-response filter multiplexes the real and imaginary components of the received waveform upon entry thereto.

* * * * *